United States Patent [19]

Isaki et al.

[11] Patent Number: 5,323,139
[45] Date of Patent: Jun. 21, 1994

[54] ANTITHEFT SYSTEM FOR A CAR STEREO HAVING A DETACHABLE GRILLE

[75] Inventors: Mikio Isaki; Syoji Suenaga, both of Saitama, Japan

[73] Assignee: Pioneer Electronic Corporation, Tokyo, Japan

[21] Appl. No.: 40,442

[22] Filed: Apr. 1, 1993

[30] Foreign Application Priority Data

Apr. 23, 1992 [JP] Japan ................... 4-033970

[51] Int. Cl.$^5$ ............................. B60R 25/10
[52] U.S. Cl. ................................. 340/426
[58] Field of Search ............. 340/426, 661, 568, 660, 340/686, 687

[56] References Cited

U.S. PATENT DOCUMENTS

| | | | |
|---|---|---|---|
| 4,173,750 | 11/1979 | Riba ................... | 340/661 X |
| 4,663,611 | 5/1987 | Humphrey ............ | 340/426 X |
| 4,816,909 | 3/1989 | Kimura ................ | 358/98 |
| 4,866,416 | 9/1989 | Holzhauer ............ | 340/426 |

FOREIGN PATENT DOCUMENTS

| | | |
|---|---|---|
| 0108270 | 5/1984 | European Pat. Off. . |
| 0529996 | 3/1993 | European Pat. Off. . |
| 3630542 | 3/1988 | Fed. Rep. of Germany . |
| 4008536 | 10/1990 | Fed. Rep. of Germany . |

*Primary Examiner*—Hezron E. Williams
*Assistant Examiner*—Christine K. Oda
*Attorney, Agent, or Firm*—Nikaido, Marmelstein, Murray & Oram

[57] ABSTRACT

An antitheft system, for car stereo having a detachable grille, has an identification resistor provided in the body of the car stereo, and a resistor provided in the grille. A circuit including the identification resistor and the resistor in the grille is formed when the grille is attached to the body of the car stereo. A voltage across the identification resistor is compared with a reference voltage for producing a coincident signal when the voltage is equal to the reference. In response to the coincident signal, the car stereo becomes operative.

6 Claims, 8 Drawing Sheets

ANTITHEFT SYSTEM FOR A CAR STEREO HAVING A DETACHABLE GRILLE

FIELD OF THE INVENTION

The present invention relates to an antitheft system for a car stereo provided with a detachable grille, and more particularly to a system which supplies power to a grille, which is to the car stereo only when the grille is legitimate thereby ensuring an antitheft effect.

BACKGROUND OF THE INVENTION

Increase in the use of sophisticated car stereos in recent years has caused an increase of thefts of the stereos. In order to prevent the theft of the stereo, there has been many proposals of antitheft systems.

In accordance with one of the systems, a car stereo is provided with means for registering an identification code. The user stores an arbitrary code in a memory provided in the car stereo so that the car stereo cannot be operated unless the correct code is input thereto. Such a car stereo is shown in FIG. 4. Namely, disposed on a front panel 2 of a car stereo body 1, are a cassette opening 3, a plurality of push buttons 4 for operating a cassette tape, and a liquid crystal display panel 9 for indicating information such as current time and a received frequency. At a lower portion of the opening 3, preset switches 5 are provided for setting a frequency of for example, FM channel and for displaying the set frequency. A plurality of function switches 6, time adjusting switches 7 and a display exchange switch 8 are provided at a lower portion of the preset switches 5. A volume control knob 10 and a matrix of code keys 11 are disposed at the left side of the front panel 2.

As shown in FIG. 5, the control system of the car stereo has a microcomputer 13 applied with a voltage of 5 V from a 5 V supply circuit 12 and connected to the liquid crystal display panel 9 through a display driver 17. An 8 V supply circuit 14 is connected to a lighting lamp 15 through a protection circuit 16 and to other mechanisms such as those for playing a cassette tape. The protection circuit 16 operates to stop the supply of power when the microcomputer 13 detects a problem such as a short-circuit.

The control system further has a key code producing circuit 18 which transmits an input code in accordance with the operation of the code keys 11. The code is fed to the microcomputer 13. A memory 19 is provided for storing the code set by the user.

Prior to playing the car stereo, the user registers a code of his choice by operating the code keys 11, which is then stored in the memory 19. In order to play the car stereo, the user inputs the registered code by operating the code keys 11. The code is applied to the microcomputer 13 which compares it with the stored code in the memory 19. When the codes coincide with each other, the protection circuit 16 is released so as to apply the 8 V to actuate the liquid crystal display panel and to operate other mechanisms of the car stereo. If an incorrect code is input, the protection circuit 16 stays operative so that the car stereo cannot be played, thereby preventing theft of the car stereo.

The control system must be provided with the key code generating circuit so that the construction thereof becomes complicated. Moreover, a thief might succeed in detecting the set code through numerous attempts at the keys.

Another type of a car stereo is built into a quick-removal chassis in a dashboard. Referring to FIG. 6 showing such a car stereo, there are provided various pushbuttons, keys, knob and cassette tape opening, which are identified by the same references as the car stereo shown in FIG. 4. In addition, the car stereo is provided with a rotatable handle 27 and a connector (not shown) provided at the back of the body 1. When the car stereo body 1 is mounted in the dashboard of an automobile the connector of the car stereo is connected with a connector provided in the dashboard, thereby supplying power to the car stereo from the automobile.

When leaving the automobile, the driver pulls out the car stereo body 1 from the dashboard with the handle 27 and takes it with him or her. However, the car stereo is heavy, hence undesirable to carry about.

Referring to FIG. 7, there has further been proposed a car stereo having a body 1a and a detachable grille 20 attached to the body 1a. The same references as those in FIGS. 4 and 6 designate the same parts.

A front panel 1b having a recess 1c is fixed on the outer periphery of the front portion of the car stereo body 1a. The recess 1c is so dimensioned that the grille 20 snugly fits therein. At an upper central portion of the recess 1c is formed a cassette opening 21. Three push buttons 22 are provided on the opposite sides of the cassette opening 21. A connector 23 which is connected to a connector (not shown) provided at the 20 back of the grille 20 when the grille is attached, is formed on the panel 1b.

The grille 20 has the cassette opening 3 which coincides with the cassette opening 21 of the body 1a and push buttons 4 provided opposite sides of the 25 cassette opening 3 corresponding to the push buttons 22 of the body 1a for operating a cassette tape. At a lower portion of the opening 3, preset switches 5 are provided. The volume control knob 10, function switches 6, time adjusting switches 7 and a display exchange switch 8 are provided at a lower portion of the preset switches 5. The liquid crystal display panel 9 is disposed at a right portion of the grille 20.

In order to attach the grille 20 on the body 1a, a groove 24 formed in one side of the grille 20 is engaged with a projection (not shown) projecting into the recess of the panel 1b from an inner edge thereof, thereby positioning the grille 20. The grille 20 is then pivoted about the projection so as to close in on the panel 1b, so that a push-push mechanism (not shown) provided in the body 1a engages with a recess (not shown) formed at the inner corner of the other end of the grille 20.

In order to detach the grille 20 from the panel 1b, the grille 20 at the side having the inner recess is depressed. The push-push mechanism is accordingly operated to project the grille 20. The grille 20 is pivoted about the projection and pulled off the panel 1b of the body 1a.

In order to operate the car stereo, each of the stereo body 1a and the grille 20 has a control system as shown in FIG. 8. The control system for the grille 20 comprises a microcomputer 26, key code producing circuit 18 connected with the operation switches 5 to 8 so as to transmit a key code in accordance with the operation of the switches, display driver 17 operated by the microcomputer 26 for driving the liquid crystal display panel 9, lighting lamp 15, and the connector 25. The control system for the stereo body 1a comprises the microcomputer 13 for controlling various operation modes of the car stereo, 5 V supply circuit 12 for supplying the voltage of 5 V to the microcomputer 13, 8 V supply circuit 14, protection circuit 16, and the connector 23.

The connector 23 of the body has a 5 V supply terminal 23a, data output terminal 23b, data input terminal 23c, key code input terminal 23d and 8 V supply terminal 23e. The terminals 23a and 23e are connected to the 5 V supply circuit 12 and the 8 V supply circuit 14, respectively, through the protection circuit 16. The data output and input terminals 23b and 23c are connected to the microcomputer 13. The microcomputer 13 is connected to the protection circuit 16 so as to operate the circuit. When the grille 20 is detached, the protection circuit 16 stops the supply of voltage from the 5 V supply circuit 12 and 8 V supply circuit 14 to the terminals 23a and 23e. Thus, the car stereo circuitry provided in the body 1a is protected from damage which is caused by the short-circuiting of the exposed terminals 23a to 23e.

The connector 25 of the grille 20 has terminals which correspond to the terminals 23a to 23e of the connector 23. Namely, there is provided a 5 V input terminal 23a, data input terminal 23b, data output terminal 23c, key code output terminal 23d, and 8 V input terminal 25e. The terminal 25a is connected to the microcomputer 26 so as to supply the 5 V voltage thereto. The microcomputer 26 receives data from the microcomputer 13 through the data input and output terminals 25b and 23b dependent on the operation of the operation switches 5 to 8 on the grille 20. A signal of the microcomputer 26 is applied to the microcomputer 13 through data output terminal 25c and data input terminal 23c. The microcomputer 26 applies a control signal to the display driver 17 to indicate the received data on the display 9. The 8 V input terminal 25e is connected to the lamp 15 for lighting the display 9.

When the grille 20 is taken out, the stereo body 1a loses the appearance of a car stereo. Hence, if the driver takes the grille 20 with him or here when leaving the vehicle, the theft of the car stereo is prevented.

However, the car stereo does not completely prevent theft, since the existence of the car stereo may be found despite its appearance. The stolen car stereo body without the grille may be easily played if an appropriate grille is stolen elsewhere and attached to the body.

Thus, none of the conventional car stereos are effective in preventing theft.

SUMMARY OF THE INVENTION

An object of the present invention is to provide a system for a car stereo having a detachable grille, wherein the car stereo can be effectively prevented from theft with a simple construction.

According to the present invention there is provided an antitheft system for car stereo having a detachable grille attached to a body of the car stereo, the grille having operating switches for selecting operating modes of the car stereo, comprising, a voltage supply circuit provided in the body of the car stereo, an identification resistor provided in the body of the car stereo, a resistor provided in the grille, circuit device forming a circuit including the voltage supply circuit, the identification resistor and the resistor in the grille when the grille is attached to the body of the car stereo, detector device for detecting a voltage across the identification resistor and for producing a coincident signal when the detected voltage is equal to a predetermined voltage, actuating and device responsive to the coincident signal for rendering the car stereo operative.

In an aspect of the invention, the detector device comprises a comparator and a memory storing a reference voltage as the predetermined voltage, and the actuating device is protection release device for releasing a protection of the car stereo.

When the legitimate detachable grille is attached to the body of the car stereo, the voltage across the identification resistor in the body coincides with the reference voltage stored in the memory. The operation of the protection circuit is revoked to render the car stereo operable.

The other objects and features of this invention will become understood from the following description with reference to the accompanying drawings.

DETAILED DESCRIPTION OF THE PREFERRED EMBODIMENTS

Figure 7:
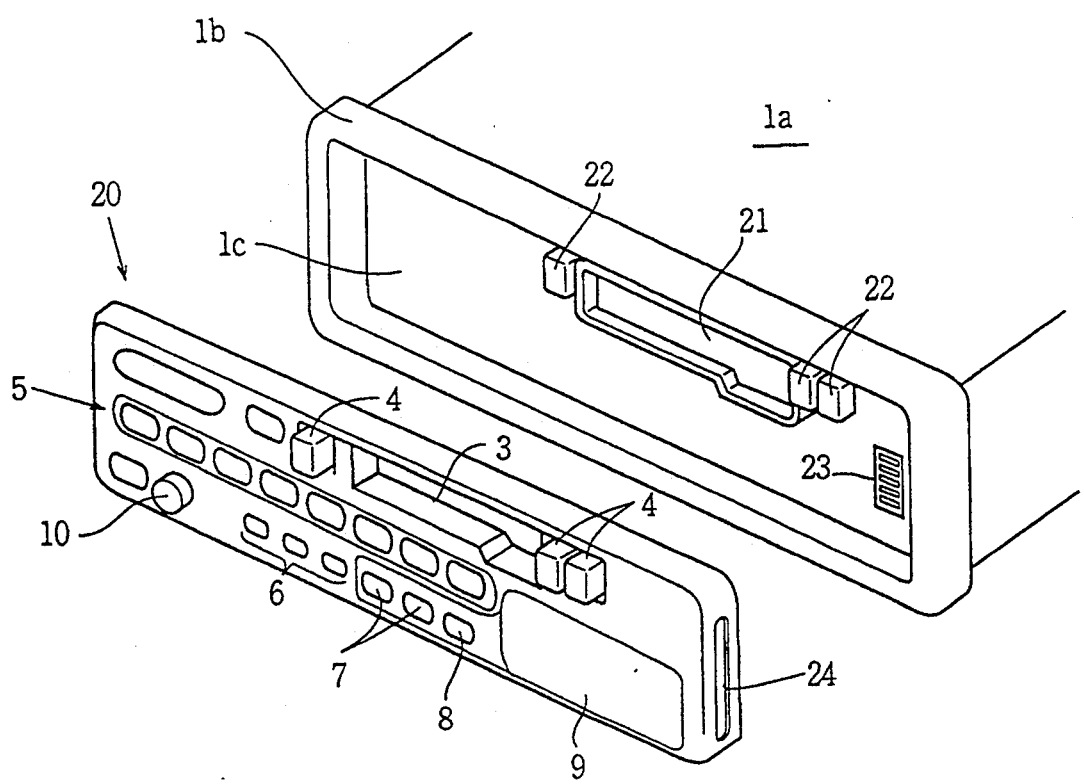
FIG. 7 is a perspective view of a conventional car stereo having a detachable grille.

The present invention is applied to a car stereo having a body and a detachable grille, which is already described with reference to FIGS. 7 and 8. The same parts in FIGS. 1 and 2 are identified by the same references as in FIGS. 7 and 8, so that further descriptions thereof are omitted.

Figure 1:
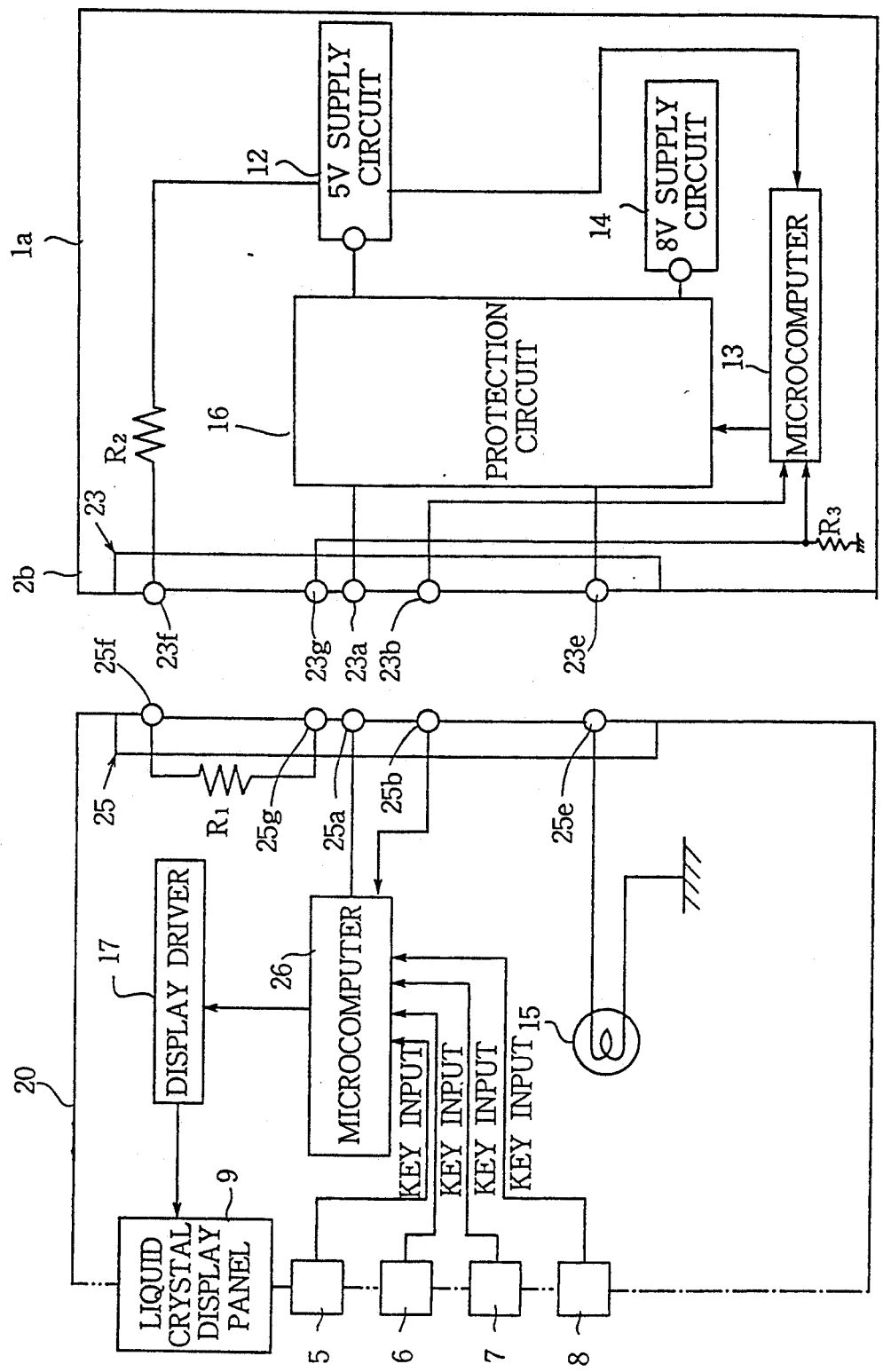
FIG. 1 is a block diagram of a control system provided in a car stereo body and a grille of a car stereo of the present invention.
Figure 2:
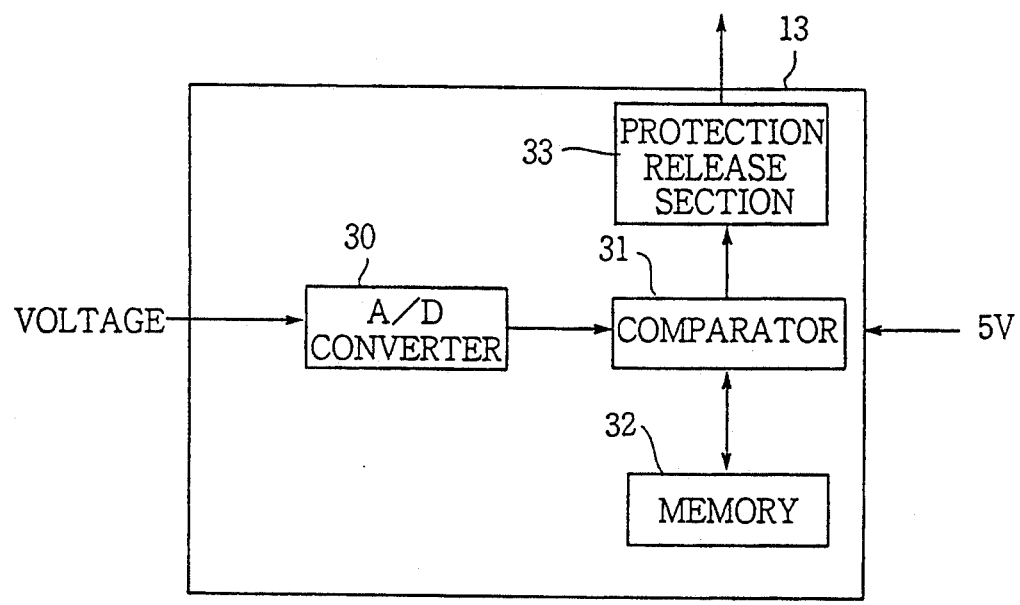
FIG. 2 is a block diagram of a microcomputer provided in the control system of FIG. 1.
Figure 8:
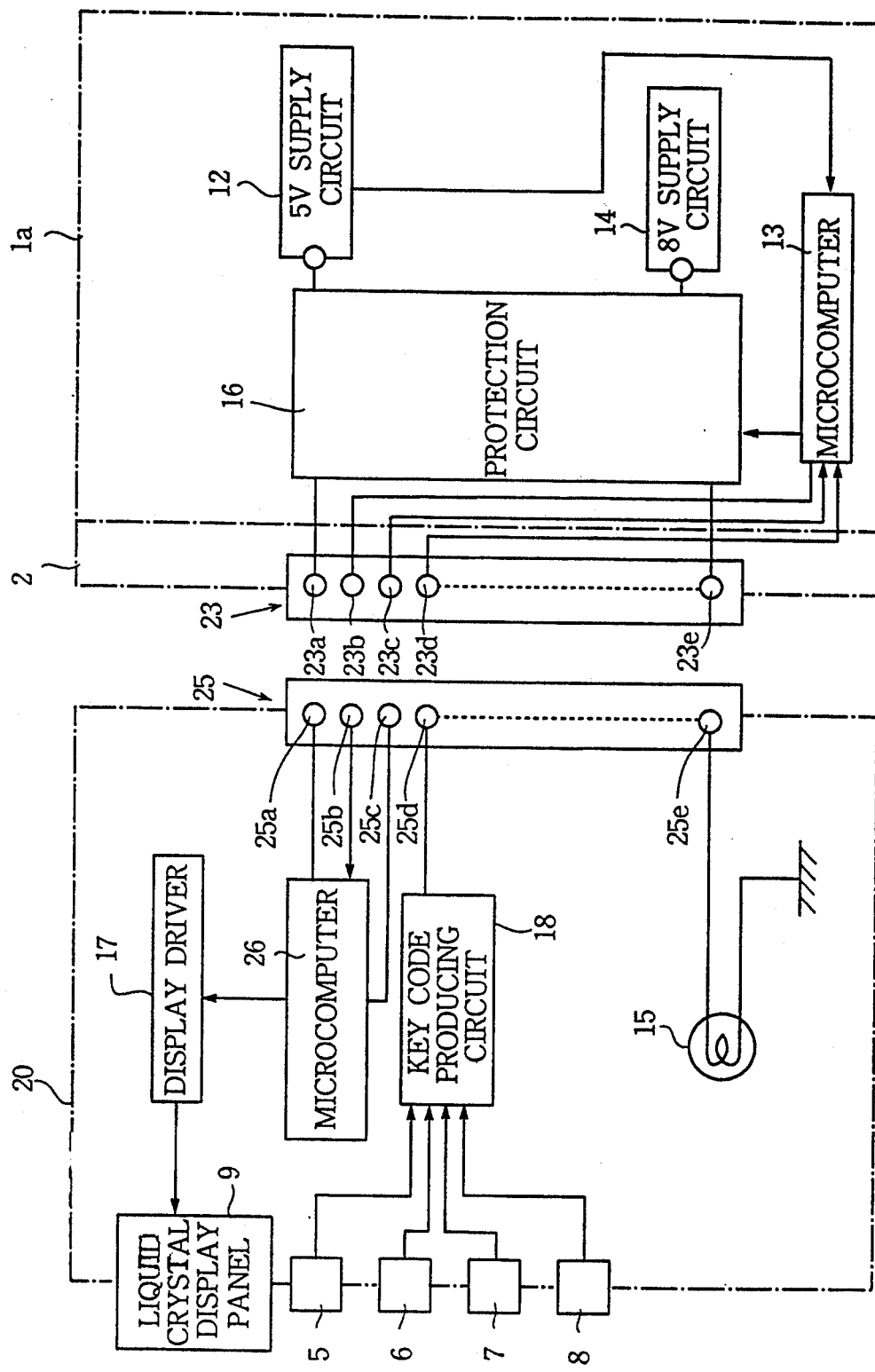
FIG. 8 is a block diagram of a control system provided in the car stereo body and the grille of the car stereo of FIG. 7.

Referring to FIG. 1, in the control system of the present invention, the key code generating circuit 18 in FIG. 8 is omitted so that the microcomputer 26 in the grille 20 is directly operated in accordance with the operation of the keys 5 to 8. The microcomputer 26 applies and receives signals to and from the microcomputer 13 through the terminals 25b and 23b. Hence the terminals 25c, 25d, 23c, and 23d are also omitted.

In addition, the 5 V supply circuit 12 is further connected to a terminal 23f of the connector 23 through a resistor R2. The connector 25 of the detachable grille 20 has a terminal 25f, which is adapted to be connected to the terminal 23f. The terminal 25f is connected through a resistor R1 to a terminal 25g which corresponds to a terminal 23g of the connector 23. The terminal 23g is grounded through an identification resistor R3 and the voltage at the end of the resistor R3 opposite to the ground is applied to the microcomputer 13.

The resistances of the resistors R1, R2 and R3 can be set at various values. For example, in a type-A combination of the car stereo, the resistances of the resistors R1, and R2 are 500 ohms, respectively, and the resistance of the resistor R3 is 1K ohms. When the terminals 25f, 23f and the terminals 23g, 25g are connected, the voltage across the resistor R3 is 2.5 volts. In a type-B combination of the car stereo the resistances of the resistors R1 and R2 are 1K ohms, respectively, and the resistance of the resistor R3 is 2K ohms. Hence, the voltage across the resistor R3 is also 2.5 volts.

Referring to FIG. 2, the microcomputer 13 has an A/D converter 30 to which the voltage at the resistor R3 is fed so as to be converted into a digital value. The digital value, representing the actual voltage is applied to a comparator 31 wherein the actual voltage is compared with a predetermined reference voltage stored in a memory 32. The reference voltage is, for example, 2.5 volts, which corresponds to a voltage produced when a proper grille is attached to the car stereo body. The reference voltage is stored in the memory beforehand in a factory in accordance with the combination of the resistors R1, R2 and R3 provided in the car stereo.

When the actual voltage coincides with the reference voltage, a signal is applied to a protection release section 33 which renders the protection circuit 16 inoperative. As a result, the microcomputer 26 of the grille 20 is supplied with the 5 V voltage from the 5 V supply circuit 12 and the lighting lamp 15 is supplied with the 8 V voltage from the 8 V supply circuit 14.

The operation of the system is described hereinafter with reference to FIG. 3. When the detachable grille 20 of the type A is attached to the front panel 1b of the car stereo body 1a of the type A, the connector 25 of the grille 20 is connected to the connector 23 of the body 1a. Consequently, the voltage of 5 volts is supplied from the 5 V supply circuit 12 to the terminal 23f through the terminal 25f. Since the resistances of the resistors R1 and R2 are 500 ohms, respectively, and the resistance of the resistor R3 is 1K ohms, the voltage at the end of the resistor R3 is 2.5 V, which is applied to the microcomputer 13.

In the microcomputer 13, the 2.5 volts is digitized by the A/D converter 30 and applied to the comparator 31, which derives the reference voltage of 2.5 volts from the memory 32.

Figure 3:
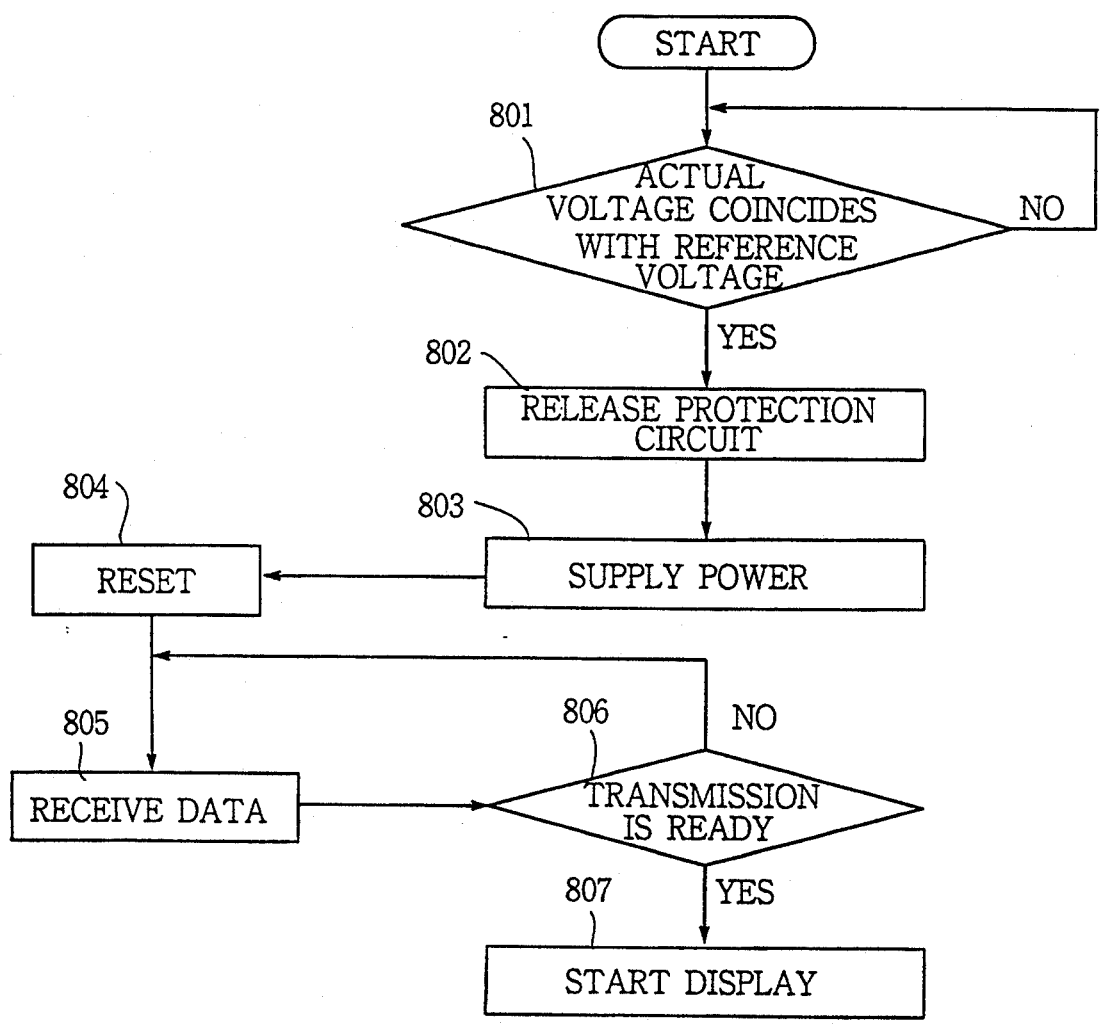
FIG. 3 is a flowchart describing the operation of the control system of the present invention.
Figure 4:
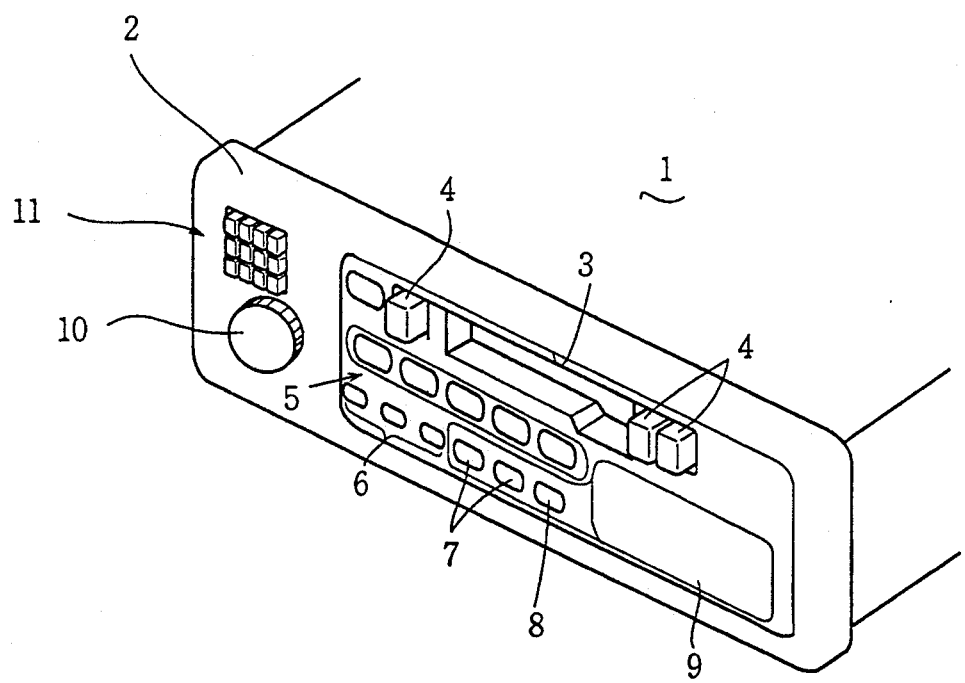
FIG. 4 is a perspective view of a conventional car stereo provided with code keys.
Figure 5:
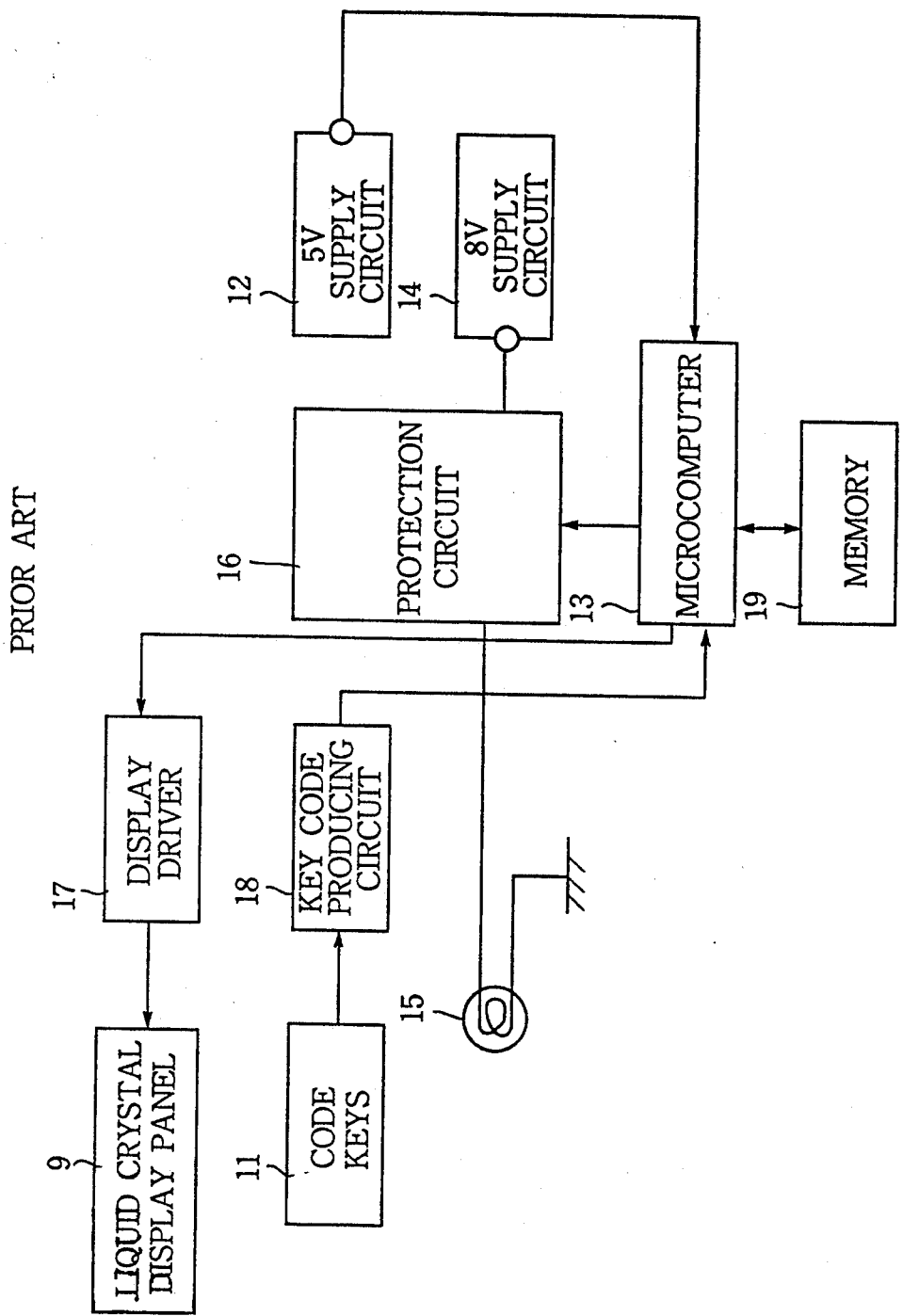
FIG. 5 is a block diagram of a control system provided in the car stereo of FIG. 4.
Figure 6:
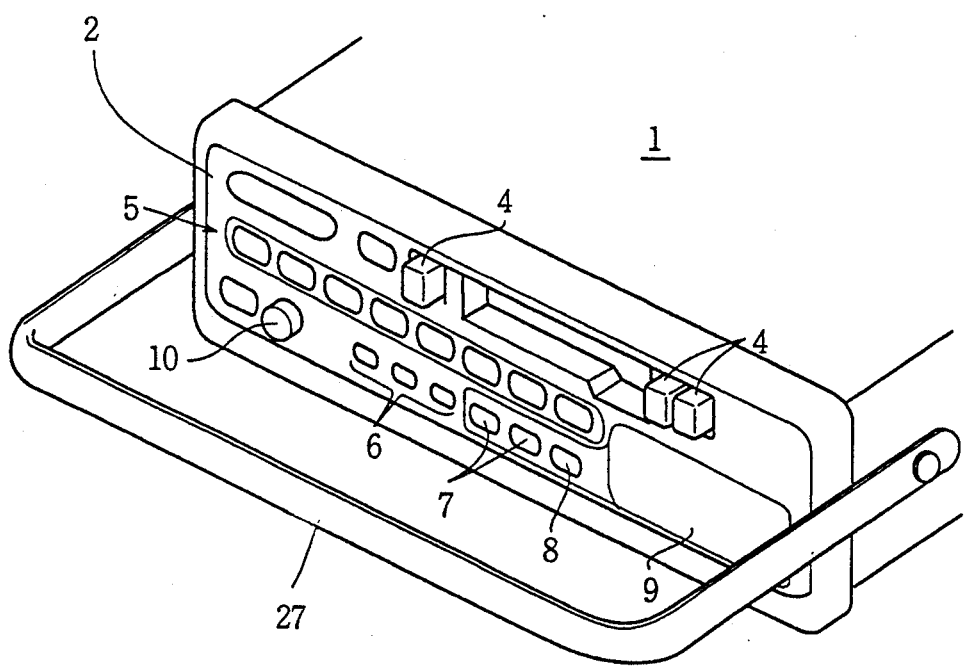
FIG. 6 is a perspective view of another conventional car stereo mounted in a quick-removal chassis.

As shown in the flowchart of FIG. 3, the digital value representing the actual voltage of 2.5 volts at the resistor R3 is compared with the reference voltage 2.5 volts at a step 801. Since the two values coincide with each other, the program proceeds to a step 802 where the operation of the protection circuit 16 is released. Thereafter, the 5 V supply circuit 12 is connected to the microcomputer 26 of the grille 20 through the terminals 23a and 25a, and the 8 V supply circuit 14 is connected to the lighting lamp 15 and other mechanisms through the terminals 23e and 25e at a step 803.

Upon energization, the microcomputer 26 is reset at a step 804 and receives predetermined data from the microcomputer 13 in the car stereo body 1a through the terminals 23b and 25b at a step 805. When it is determined at a step 806 that the predetermined data are received, it means that it is ready to start the transmission of signals between the car stereo body 1a and the grille 20. Thus, the liquid crystal display panel 9 is operated through the display driver 17 to display initial data such as the current time.

If the type-B grille having the resistor R1, the resistance of which is 1K ohms, is attached to the type-A car stereo body, the voltage applied to the microcomputer 13 becomes 2 volts. Hence the actual voltage does not coincide with the reference voltage 2.5 volts. The step 801 is repeated so that the protection circuit 16 is operated. Accordingly, the car stereo cannot be used.

The present invention may be modified so as to be provided with a gate means or a Zener diode, which produces a signal at a predetermined voltage at the identification resistor, instead of the comparator.

From the foregoing it will be understood that the present invention provides a car stereo having a detachable grille where the car stereo cannot be operated unless the car stereo body and the grille match. Namely, the car stereo will work only when the circuit formed by connecting the grille to the car stereo body provides a predetermined voltage. Since numerous types of car stereos can be manufactured by simply changing the resistors and the predetermined voltage, it will be difficult to find an appropriate grille for a specific car stereo. Therefore, a car stereo without the grille will be completely useless, thereby improving the antitheft effect.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. An antitheft system for a car stereo having a detachable grille attached to a body of the car stereo, the grille having operating switches for selecting operating modes of the car stereo, the antitheft system comprising:

a voltage supply circuit provided in the body of the car stereo;

an identification resistor provided in the body of the car stereo;

a resistor provided in the grille;

circuit means forming a circuit including the voltage supply circuit, the identification resistor and the resistor in the grille when the grille is attached to the body of the car stereo;

detector means for detecting a voltage across the identification resistor and for producing a coincident signal when the detected voltage is equal to a predetermined voltage;

actuating means responsive to the coincident signal for rendering the car stereo operative.

2. The system according to claim 1 wherein said detector means comprises a comparator and a memory storing a reference voltage as the predetermined voltage.

3. The system according to claim 1 wherein said actuating means is protection release means for releasing a protection circuit of the car stereo.

4. The antitheft system according to claim 1 wherein said detector means comprises a comparator and a memory storing a reference voltage as the predetermined voltage.

5. The antitheft system according to claim 1 wherein said actuating means is protection release means for releasing a protection circuit of the car stereo.

6. An antitheft system for a car stereo to which an original grille is to be attached, the original grille having operating switches for selecting operating modes of the car stereo and a resistor, the antitheft system comprising:

a voltage supply circuit provided in the body of the car stereo;

an identification resistor provided in the body of the car stereo;

circuit means forming a circuit including the voltage supply circuit, the identification resistor and the resistor in the grille when the grille is attached to the body of the car stereo;

the resistance of the identification resistor being set to a value corresponding to the resistance of the resistor of the original grille so that a predetermined voltage is produced across the identification resistor when the grille is attached to the car stereo body;

detector means for detecting the voltage across the identification resistor and for producing a coincident signal when the detected voltage is equal to the predetermined voltage; and actuating means responsive to the coincident signal for rendering the car stereo operative.

* * * * *